US006606553B2

United States Patent
Zobell et al.

(10) Patent No.: US 6,606,553 B2
(45) Date of Patent: Aug. 12, 2003

(54) TRAFFIC FLOW MANAGEMENT METHOD AND SYSTEM FOR WEATHER PROBLEM RESOLUTION

(75) Inventors: Stephen M. Zobell, McLean, VA (US); Celesta G. Ball, Burke, VA (US); Joseph E. Sherry, Ponte Vedra Beach, FL (US)

(73) Assignee: The Mitre Corporation, McLean, VA (US)

( * ) Notice: Subject to any disclaimer, the term of this patent is extended or adjusted under 35 U.S.C. 154(b) by 0 days.

(21) Appl. No.: 10/272,951

(22) Filed: Oct. 18, 2002

(65) Prior Publication Data

US 2003/0078719 A1 Apr. 24, 2003

Related U.S. Application Data

(60) Provisional application No. 60/330,123, filed on Oct. 19, 2001.

(51) Int. Cl.[7] .............................................. G08B 21/00
(52) U.S. Cl. ...................... 701/120; 701/300; 701/122
(58) Field of Search ........................... 701/1, 11, 3, 16, 701/120, 122, 207, 208, 213, 300, 301; 340/947, 961, 982, 990, 995, 29; 342/36, 454, 455, 456

(56) References Cited

U.S. PATENT DOCUMENTS

| 3,623,090 A | 11/1971 | Gilbert et al. |
| 3,706,969 A | 12/1972 | Paredes |
| 3,925,750 A | 12/1975 | Gilbert et al. |
| 4,086,632 A | 4/1978 | Lions |
| 4,538,229 A | 8/1985 | Baltzer et al. |
| 4,628,456 A | 12/1986 | Hatano et al. |
| 4,642,775 A | 2/1987 | Cline et al. |
| 4,792,906 A | 12/1988 | King et al. |
| 4,827,419 A | 5/1989 | Selby, III |
| 5,047,946 A | 9/1991 | King et al. |
| 5,340,061 A | 8/1994 | Vaquier et al. |
| 5,531,402 A | 7/1996 | Dahl |
| 5,715,163 A | 2/1998 | Bang et al. |
| 5,797,106 A | 8/1998 | Murray et al. |
| 5,842,142 A | 11/1998 | Murray et al. |
| 5,867,804 A | * 2/1999 | Pilley et al. ................. 701/120 |
| 6,195,609 B1 | * 2/2001 | Pilley et al. ................. 701/120 |
| 6,314,362 B1 | * 11/2001 | Erzberger et al. ........... 701/120 |

OTHER PUBLICATIONS

Sherry, J.E. et al.; "Traffic Flow Management (TFM) Weather Rerouting Decision Support"; Ninth Conference on Aviation, Range, and Aerospace Meteorology, Sep. 2000.

* cited by examiner

*Primary Examiner*—Richard M. Camby
(74) *Attorney, Agent, or Firm*—Rosenberg, Klein & Lee (57) ABSTRACT

Weather problem resolution in air traffic flow management is accomplished by automatically deriving a flow of constrained areas from a weather forecast product, generating a candidate flight list including conflict flights predicted to be affected by the flow constraint areas for each conflict flight from the candidate flight list order, generating reroute corridors available, and selecting the best available reroute corridor. Sector workloads are estimated which are affected by rerouting of the conflict flight onto the selected corridor. The corridor is accepted for the conflict flight if sector workloads are below preset limits, or, if the flight would cause the sector workloads to increase beyond the preset workload limits, a check is made for ground delaying the flight, and if found impossible, rejecting the corridor and examining the next available corridor for rerouting the flight.

25 Claims, 4 Drawing Sheets

TRAFFIC FLOW MANAGEMENT METHOD AND SYSTEM FOR WEATHER PROBLEM RESOLUTION

REFERENCE TO RELATED PATENT APPLICATIONS

This Patent Application is based on a Provisional Patent Application Serial No. 60/330,123 filed on Oct. 19, 2001.

BACKGROUND OF THE INVENTION

The present invention relates to air traffic control; and in particular, to a method and a system for collaborative coordination of traffic flow rerouting needed under severe weather conditions to minimize the input of severe weather on the National Airspace System (NAS).

Further, the present invention relates to particular traffic flow management using a proactive decision support tool based on accurate convective weather forecasts for rerouting aircrafts around forecasted areas of severe weather while maintaining safe levels of controller's workload and minimal traffic delays.

The present invention also relates to managing traffic demand in sectors adjacent to weather constrained areas in order to maximize throughput while avoiding exceeding the available capacity of such sectors.

The present invention further relates to rerouting traffic around severe weather areas, where the plan of rerouting aircrafts is automatically assessed based on affected sector loading, extra air miles flown, total aircraft delay, and ground delay. In this manner, if the assessment is deemed to be non-satisfactory, a rerouting plan may be modified by adding, removing, or modifying traffic designated routes.

The present invention is further related to a traffic flow management system automated to an extent which permits quick creation, modification, and rerouting assessment plans, in order to permit collaboration with human traffic controller specialist. Subsequent to such collaboration, the plan, if accepted, is communicated electronically to Air Traffic Control for implementation with strict time requirements. The entire process is based on weather forecasts which are updated frequently, to permit traffic flow management reroute plans to be updated accordingly.

FIELD OF THE INVENTION

During recent years, increased air traffic has intensified the input of severe weather on the National Airspace System (NAS), which leads to delays, cancellations, increased miles flown, greater schedule uncertainty, and other undesirable air traffic changes. To respond to difficulties in traffic flow management associated with severe weather conditions, several systems have been developed to alleviate air traffic delays caused by severe weather.

For example, a Collaborative Rerouting Coordination Tool (CRCT) has been developed by the Federal Aviation Administration's Center for Advanced Aviation System Development, aided by The MITRE Corporation, McLean, Va. The baseline CRCT is a set of decision support capabilities being developed to evaluate and demonstrate traffic flow management concepts. The baseline CRCT is currently in daily use and is being operationally evaluated at the Air Traffic Control System Command Center and the Air Route Traffic Control Center. The baseline CRCT includes functionality for rerouting around manually generated Flow Constrained Areas (FCAs), automatic identification of aircraft predicted to enter FCAs, manual rerouting of aircraft around FCAs, and automatic assessment of the input of proposed reroutes on sector traffic volume.

In baseline CRCT, a Traffic Management Specialist (TMS) manually draws an FCA polygon to represent an area impacted by weather or other factors that limit traffic flow. Disadvantageously, manual FCA generation is practical only when few FCAs are needed and the weather is generally stable and predictable. This is often not the case with convective weather patterns, which may consist of many storm cells moving at various speeds and directions and involving complex cell growth, decay, splitting, and merging. Therefore, there is still the need for a system which would enhance the baseline CRCT to make it more practical, precise and automated.

Other flight rerouting systems have also been developed. For example, U.S. Pat. No. 4,086,632 is directed to a generic flight plan rerouting system which includes a map display unit for establishing and modifying navigation routes. When it becomes necessary to modify a previously established navigation route or to reprogram the central computer with a new navigation route during flight, a map control unit is implemented.

The map control unit includes a plurality of switches for controlling display of a program navigation route, entering new way-points to modify an existing navigation route or establish a new route, and deleting way-points from a previously established route. Signals representative of the positions of these control switches are coupled to the central computer of the system for initiation of the necessary computational operations and appropriate output signals are coupled from the central computer to the map display unit to provide an appropriate visual display.

U.S. Pat. No. 5,797,106 is directed to a method and apparatus for an improved flight management system which provides for linking of an outbound course line from a predetermined position with an existing flight plan. If the flight crew selects a course modification from a specified way-point, the flight crew enters a way-point name "XXX" into the flight management computer, and the system displays the course direction on the flight management computer. The system creates a discontinuity flight plan between the course line and the remainder of the flight plan and displays the discontinuity as a sequence of boxes on the flight management computer legs page. Further, the flight management system creates a flight plan modified state in the flight management computer. The flight crew is further given the opportunity to either approve or disapprove the outbound course entry. If the flight crew decides to accept the entered outbound course, the system determines whether or not the newly entered course line intersects the downstream leg of the originally entered flight plan. If the course line does not intersect the downstream flight leg of the presently entered flight plan, the system provides the flight crew with the option to incorporate a new outbound course line into the flight plan.

U.S. Pat. Nos. 5,715,163; 5,340,061; and, 5,047,946 are all directed to aircraft navigational systems and methods for guiding an aircraft with the option of rerouting and modification of flight plans.

Although these known flight rerouting systems all have mechanisms for calculating new navigational paths depending on a newly desired way-point, none of them is automated to an extent which permits the user to estimate and choose the best reroute option depending on a multiplicity of factors, such as flight status, number of reroute options available for each flight, availability and capacity of reroute sectors, as well as controller's workload threshold in sectors, the ability of a flight to execute the proposed reroute and equitable allocation of scarce resources in a time-satisfactory manner. Such prior art systems have not been based on use of weather forecast products for flight plan calculations, assessing and modification, where the weather forecast products are frequently updated to permit flight rerouting plans to be automatically updated accordingly.

Therefore, it is clear that an improved traffic flow management weather rerouting decision support tool free of the disadvantages of the prior art is still needed in the industry.

SUMMARY OF THE INVENTION

It is an object of the present invention to provide a method and system for effective weather rerouting decision support based on frequently updated weather forecasts, as well as on the basis of a plurality of associated factors in very time-optimized and safe manner.

It is additionally an object of the present invention to provide a system and method of traffic flow management for weather problem resolution which evaluates rerouting plans for flights that are in conflict with weather based on several parameters specified by the traffic management specialist. The system performs an optimization of the plan or plans to determine which flights will be assigned to each designated reroutes based on optimization criteria such as minimizing arrival delays while staying within the controller's workload limits for each designated reroute.

It is a further object of the present invention to provide a rerouting system which evaluates the rerouting plan and, upon plan evaluation, displays the evaluation results which include statistics on flight delays and the number of aircraft rerouted as well as information about the flights that were not able to be incorporated into the rerouting plan. The non-incorporated flight results include the number of flights that could not find a slot on any designated reroute, and the number of flights that would have had to be turned too sharply to reach a designated reroute.

It is a still further object of the present invention to provide a traffic management system for rerouting flights under severe weather conditions which generates predicted sector loading based on the plan reroutes to avoid unacceptable work loads for sector controllers.

It is a further object of the present invention to provide a system and method for rerouting aircraft around the areas of severe weather in which the planned reroutes are evaluated, in order that the plan may be modified to add new reroute corridors in order to avoid congested areas, or delete ineffective reroute corridors. The new plan may then be evaluated in order to produce a new set of reroutes with the results of the new plan being assessed. The cycle may be repeated until the traffic management specialist is satisfied that the plan moves flights past the weather as efficiently and safely as possible.

According to the teachings of the present invention, there is provided a method for weather problem resolution in air traffic flow management which includes the steps of:

automatically deriving flow constrained areas (FCAs) from a weather forecast product (such as National Convective Weather Forecast, Collaborative Convective Forecast Product, etc.);

generating a candidate flight list including conflict flights which are predicted to be affected by the FCAs;

for each conflict flight, in a predetermined priority order, generating a plurality of available reroute corridors;

selecting the best available reroute corridor from the generated plurality of available reroute corridors;

calculating a four-dimensional trajectory for reroute of the each conflict flight onto the best available reroute corridor;

based on the four-dimensional trajectory, estimating workload of sectors (the geographical regions where single controller teams control air traffic) affected by rerouting the each conflict flight onto the best available reroute corridor; and accepting the best available corridor for the each conflict flight if the estimated sector workloads are below pre-set workload levels.

If, however, the workload of a sector is above the pre-set workload level each conflict flight is further checked for whether it may be ground delayed, and for how long, in order to avoid exceeding the pre-set workload level in the sector. The best available re-route corridor will be rejected for each conflict flight if the ground delay is impossible. After the rejection of the previously selected best available re-route corridor, another best available re-route corridor is selected from the plurality of available re-route corridors generated initially for each conflict flight.

Each conflict flight has a cost associated with use of a generated re-route corridor. The best available re-route corridor with respect to cost is selected based on the least possible cost which is determined by additional miles flown, ground delay, air delay, or total arrival delay associated with flying on or from the selected re-route corridor.

The method further comprises the steps of displaying (1) the automatically generated FCAs as polygons on a traffic display, and (2) the available re-route corridors.

The candidate flight list is sorted to provide a priority order of processing each flight in accordance with predetermined sorting criteria, which may be based on flight status (flight in the air or on the ground), predicted time of arrival to the problem area, or any other sorting criteria which may be changed as needed.

The plurality of available re-route corridors may be generated manually by a human traffic management specialist, or they may be unloaded from a data base of previously generated re-route corridors.

Each re-route corridor has restriction parameters associated therewith which include a list of fixes which each conflict flight flies through on the reroute corridor, a range of altitude which each conflict flight is allowed to use on the re-route corridor, a range of times when the re-route corridor is open, and the maximum turn angle which the conflict flight may use to turn onto or from the re-route corridor. Each of the plurality of generated available corridors has associated restriction parameters satisfying a conflict flight.

The four-dimensional trajectory predicted for each flight includes predicted locations and altitudes of the conflict flight at future times and is calculated based on the filed flight plan, conflict flight positions, upper air winds, air traffic control restrictions, NAVAID and airport locations, preferred routes, aircraft performance data, airport delay performance, etc.

Viewing another aspect of the present invention there is provided a traffic flow management system for weather problem resolution which includes:

an ability to ingest a weather forecast product, processing mechanisms operatively coupled to the weather forecast product for deriving flow constraint areas (FCAs) therefrom, a traffic display coupled to the processing mechanism for displaying the FCAs thereon, a mechanism for predicting conflict flights affected by the FCAs and for generating a candidate flight list of the conflict flights, means for sorting the candidate flight list to establish a priority order of the conflict flights in accordance with the predetermined priority criteria, means for manually generating a plurality of available re-route corridors for each of the conflict flights in the order of the established priority, wherein each available re-route corridor meets the specific restriction parameters for each conflict flight, means for selecting the best available re-route corridor from the plurality of the generated available re-route corridors in accordance with the cost of the conflict flight associated with the re-route corridor, means for calculating a four-dimensional trajectory for re-route of the each conflict flight onto the best available route corridor, and means for estimating a sector workload effected by re-routing of the conflict flight turning to the best available re-route corridor.

The traffic flow management system for weather problem resolution of the present invention further includes means for comparing the estimated workload of the sector with a pre-set workload level, means for searching for ground delay of the conflict flight if the estimated workload exceeds the preset workload, and means for searching for another best available re-route corridor if the ground delay of the conflict flight is unavailable.

These and other objects and features of the present invention will become more apparent from the following detailed description of the present invention considered in connection with the accompanying drawings which disclose an embodiment of the present invention. It should be understood, however, that drawings, as well as the description, are presented here for the purpose of illustration only and not as a definition of the limits of the invention.

DESCRIPTION OF THE PREFERRED EMBODIMENTS

Figure 1:
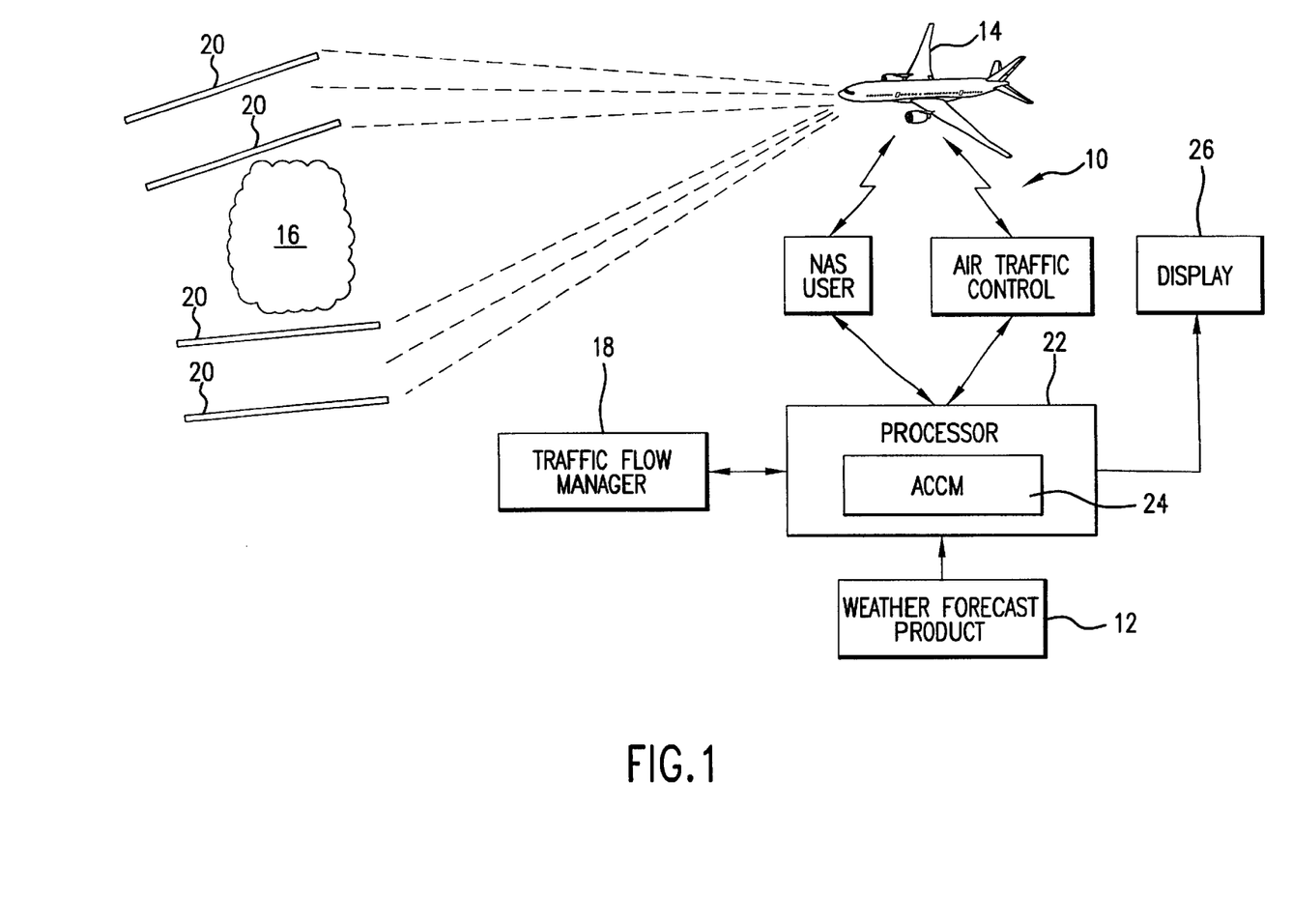
FIG. 1 is a schematic diagram showing a traffic flow management system for weather problem resolution of the present invention.

Referring to FIG. 1, system 10 for weather problem resolution utilizes convective weather forecasts 12, such as National Convective Weather Forecast (NCWF), or Collaborative Convective Forecast Product (CCFP), etc. to provide pro-active traffic flow management decision support for re-routing aircraft 14 around forecasted areas 16 of severe weather. The system 10 of the present invention has been developed to reduce aircraft delays, cancellations, maximize aircraft throughput around areas of severe weather, and to maintain safe levels of controller workload in sectors which are the geographic regions where a single controller team controls traffic.

The system 10 of the present invention is a strategic response to convective weather that is anticipated to constrain traffic flow. The system assumes the availability of accurate, 2–3 hour convective forecast 12. System 10 uses the weather forecast product 12 to automate weather flow constraint areas (FCAs) identification thereby eliminating the need for manually entry of weather FCAs. However, if desired, manual FCA entry is still available for identification of weather or other flow constraint areas. Automating FCA identification liberates traffic flow manager (TFM) 18 from the difficult and time consuming task of keeping the system updated with frequently changing severe weather forecasts. The weather forecast product may include National Convective Weather Forecast (NCWF), Collaborative Convective Forecast Product (CCFP), as well as other types of weather forecasts, e.g., turbulence, icing, etc.

System 10 of the present invention is built on the assumption that some flights will need strategic reroutes around severe weather. The system 10 is based on managing traffic demand in sectors adjacent to weather FCAs 16 in order to maximize throughput without exceeding available capacity. In other words, system 10 of the present invention effectively uses capacity in areas near severe weather 16.

In system 10, conflict between the forecasted weather areas 16 and aircraft trajectories are automatically determined, allowing operators to select only aircraft that are in conflict with the severe weather for planned reroutes. The selected rerouting of the present invention is an improvement over current tools (such as miles-in-trail, ground delays, ground stops) that have a tendency to also impact aircraft that are not in conflict with the weather. Therefore, delays incurred for weather impacted aircraft according to the principles of the present invention, are anticipated to be less than those caused by the overly encompassing and restricted tools currently available.

However, the list of aircraft to be rerouted may be modified to add aircraft with flight paths not intersecting the weather or to remove aircraft wishing to fly through it. Corridors are identified to assist in rerouting traffic around the weather FCAs 16 and to lessen complexity within affected sectors.

Next, the selected aircraft are assigned to corridors 20 based on a predefined rationing scheme. For example, one possible equitable allocation of available capacity may strive to minimize delay and maximize aircraft throughput, without overloading controller workload. This rationing scheme, initially uses corridors closest to the weather FCA 16, since they would generally result in less aircraft delay and miles flown. As nearby sector loading reaches pre-defined limits corridors farther from the weather are used.

Aircrafts are not required to enter the corridors 20 at a precise time, rather, they are predicted to arrive on or about that time. The actual arrival time may also be adjusted by delayed departures. When aircrafts are too closely spaced as they approach the corridor 20, it may be necessary for air traffic controllers to tactically maneuver aircraft to maintain proper separation. Decision support tools, such as User Request Evaluation Tool (URET) and Problem Analysis, Resolution and Ranking (PARR), which detect aircraft conflicts and assist ATC (Air Traffic Control) in obtaining proper aircraft separation may be used in this situation to help reduce controller workload.

After aircraft reroutes are identified the plan of rerouting is automatically assessed. The assessment information includes, for example, sector loading, extra air miles flown, total aircraft delay, and ground delay. If the assessment is not acceptable to the operator, a plan may be amended by adding, removing, or modifying corridors or plan parameters. The system 10 of the present invention relies heavily on automation to quickly create, modify, and assess plans of rerouting, in order that time may be set aside for human collaboration. After human collaboration, if the plan is accepted, the reroutes are communicated electronically from the processor 22 to the aircraft 14 through NAS user, Air Traffic Control and interfaces for implementation.

Figure 2:
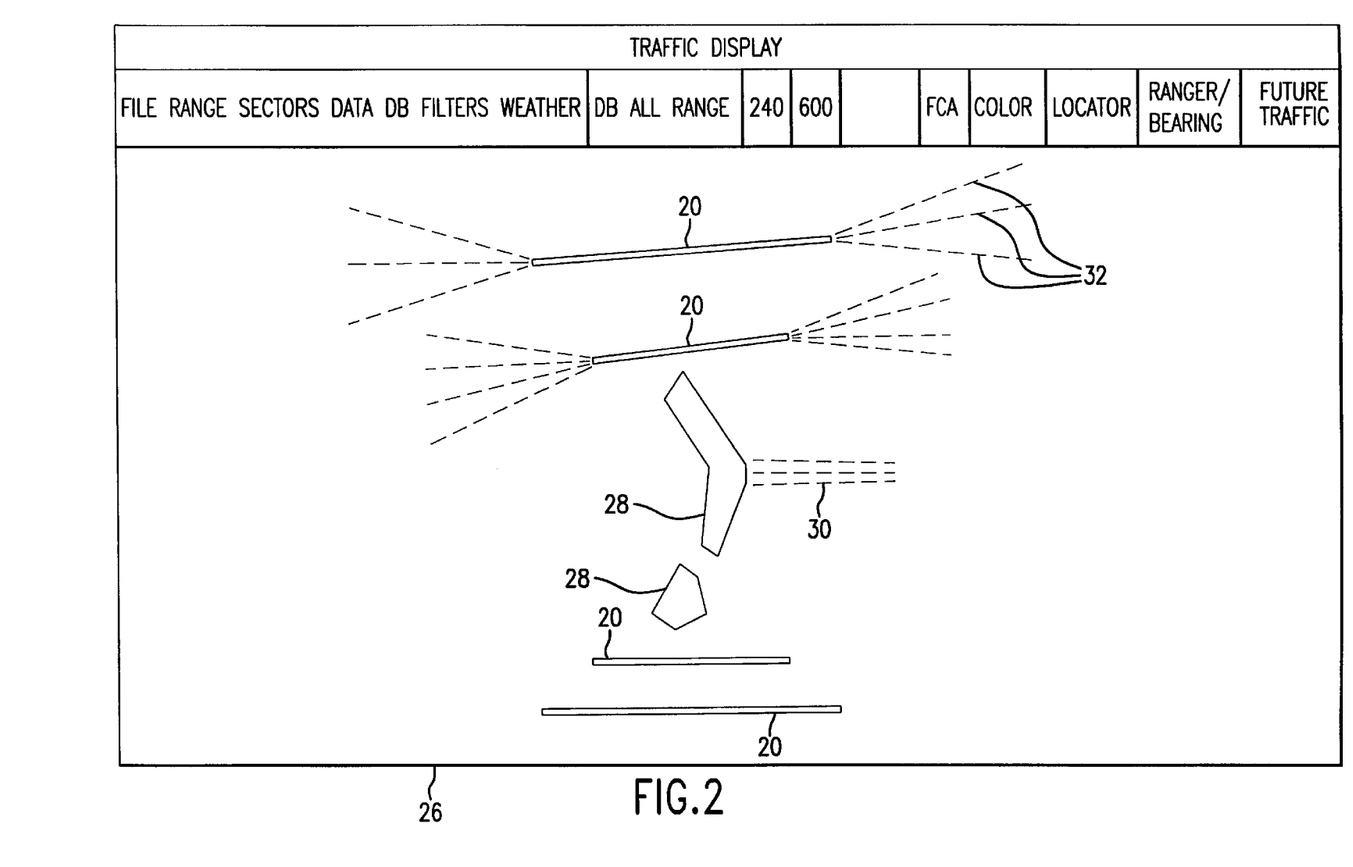
FIG. 2 represents a traffic display of the system of the present invention.
Figure 3:
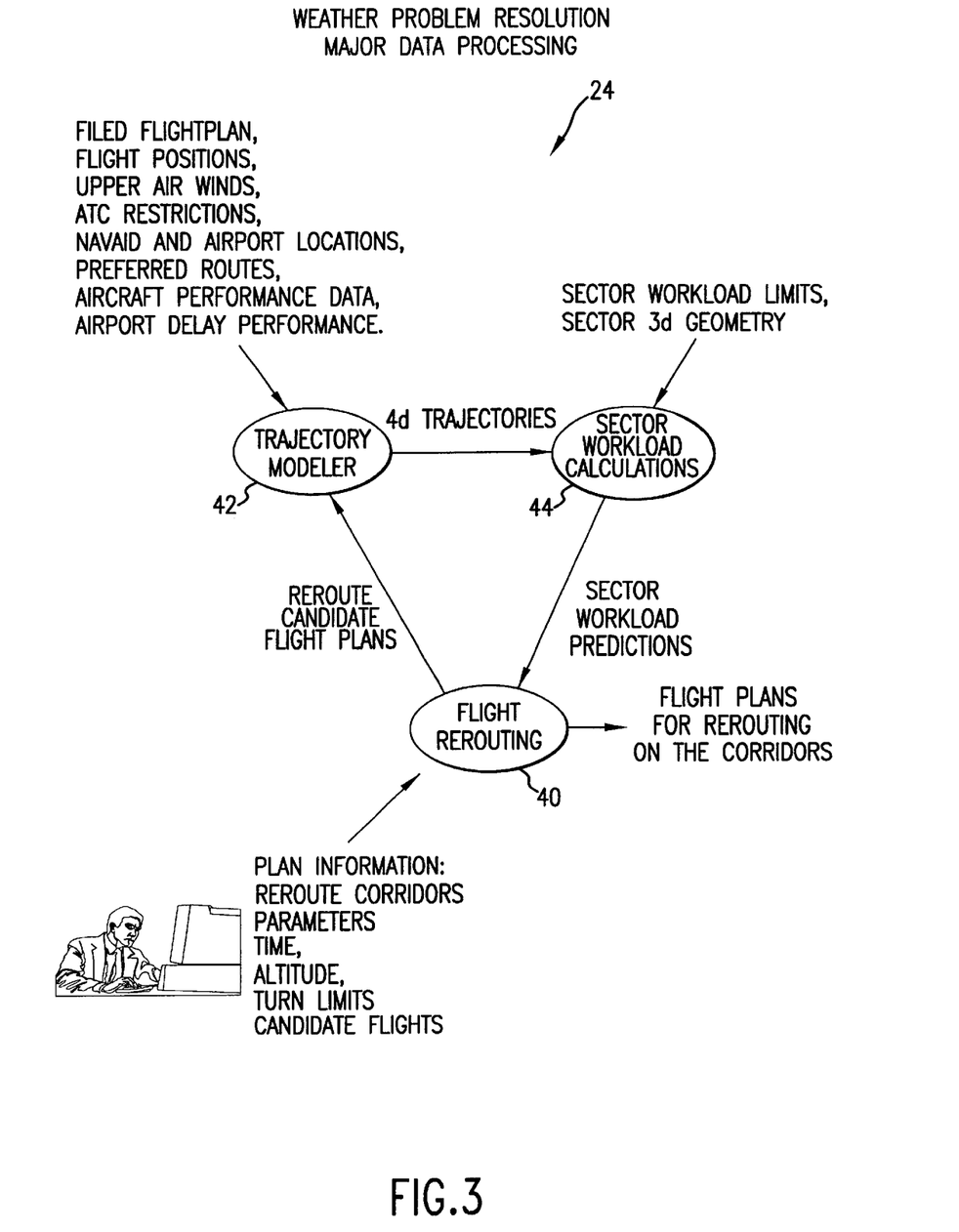
FIG. 3 is a flow chart diagram showing the process of major data processing in the weather problem resolution system of the present invention.
Figure 4:
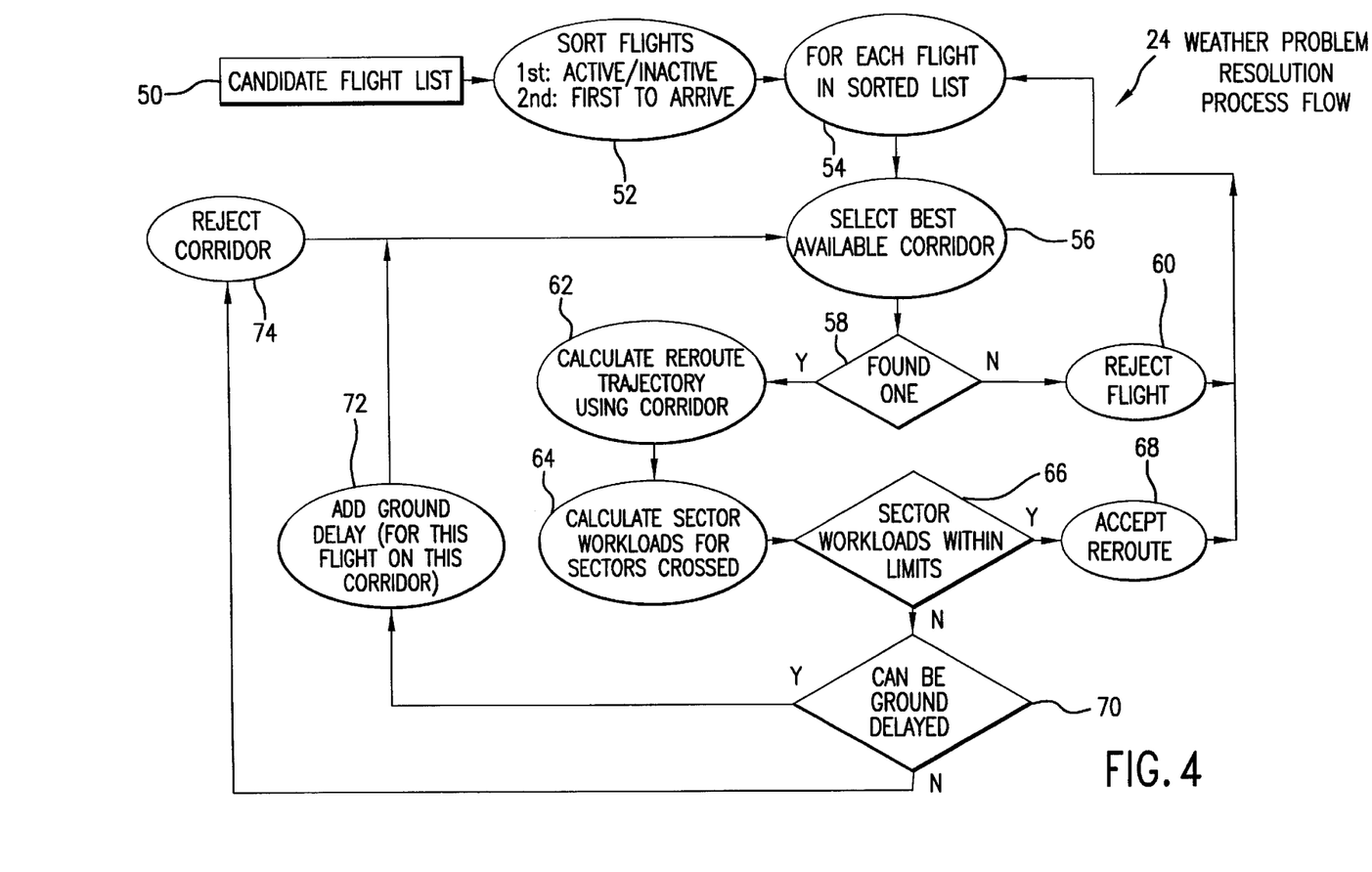
FIG. 4 is a flow-chart diagram of the process for weather problem resolution of the present invention.

Referring again to FIG. 1, the system 10 of the present invention includes the processor 22, the part of which is automated capabilities for congestion management (ACCM) 24 described in detail further with regard to FIGS. 3 and 4. The processor 22 is operatively coupled to the weather forecast product 12 for automatically deriving FCAs and displaying the same on traffic display 26 in the form of FCA polygons 28 (best shown in FIG. 2) representing the detection and predictions of severe convective weather extending out in specified (for example, 15 minute) intervals (0, 15, 30, 45, 60, 90, 105, and 120 minute forecasts).

Each weather FCA includes an altitude top and time range. ACCM 24 automatically predicts which flights will intersect the FCA polygons 28 using the aircraft trajectory and the four-dimensional location of the FCA polygons. Only forecasted areas meeting certain requirements for size and intensity are defined by the polygons 28. For example, an individual cell covering ten square miles or an area of moderate range would not be included in a forecast intended for the traffic flow management specialist's decision support, considering the former has no strategic importance and the latter has no impact on traffic flow.

Conflict between weather forecast polygons 28 and aircraft trajectories are automatically detected by the ACCM 24 and depicted in the traffic display 26 as shown in FIG. 2. The additional numerous lines 30 represent aircraft routes that are predicted to intersect with forecasted severe weather polygons 28. A list of these flights is available via a candidate flight list which is a sortable flight light of the conflict flights predicted to interfere with severe weather areas as will be described infra in detail.

The traffic flow manager 18 uses the ACCM 24, to create a plan to reroute the flights that are in conflict with the FCAs around the weather. In this manner, the traffic flow managers, in collaboration with users of ACCM 24 define weather reroute events. This plan is based not only on the convective weather forecast 12, but also on other flow constraints, local traffic patterns, and user preferences. The traffic flow managers determine how aircraft (conflict flight) will flow around storms and through any openings or holes between storms by generating corridors 20. Corridors 20 are reroute paths created by clicking on locations on the display 26 or by loading previously-defined corridors. FIG. 2 depicts an example of such a plan with two corridors to the North and South of an area impacted by weather FCAs.

In creating such a plan, the controller workload is dispersed across multiple sectors which are geographical regions controllable by a single team of controllers. For example, a corridor around the weather may originate and terminate in sectors to the Northeast and Northwest of a severe line of thunderstorms. This allows the workload associated with merging and diverging traffic to be off-loaded from the sector immediately North of the weather impacted area. Even if a large number of flights are sent to the sector to the North of the storm, the associated controller workload may be more manageable since the additional traffic would be more structured. Additional routes may be defined farther North or South to further disperse controller workload and/or increase traffic throughput. Controller workload is also maintained at or below appropriate levels by linking corridor usage to sector capacity limits. In this manner, sector capacity may be fully used without exceeding predetermined limits.

Although the corridors 20, shown in FIG. 2, each have only two nodes, corridors may have any number of nodes, orientation, and may even cross each other.

The traffic flow manager 18 can specify parameters for each corridor 20, such as time periods, altitude range, and maximum angle an aircraft can turn to deviate from the original route.

Once corridors 20 are defined, ACCM 24 uses the corridors and the prearranged rationing scheme to create aircraft reroutes around the weather. For reducing delay the corridors closer to the storm are first used, and, when the sectors these corridors cross reach capacity, corridors more distant from the storm are utilized.

After the traffic flow management specialist creates an initial plan, ACCM 24 evaluates the plan and attempts to find reroutes onto the corridors for flights that are in conflict with weather. Initially, the corridors that each flight may potentially use are determined based on the parameters of the corridor, such as the maximum turn angle, time range, and altitude range of the corridors. Subsequently, ACCM 24 performs an optimization to determine which flights will be assigned to each corridor based on minimizing arrival delays while staying within the workload limits of the sectors the flight would pass through. A flight scheduled to take-off after the planned start time may be delayed on the ground in order to arrive in sectors when capacity is available (demand is below workload limits).

The dotted lines 32 shown on the traffic display 26 in FIG. 2 illustrate the proposed reroutes generated by ACCM 24 for this type of plan. Rerouting to one of the two corridors closest to the storm would cause the least delay for most flights, but the workload limits of sectors the corridor passes through have caused some of those flights to use the corridors farther to the North and South. ACCM 24 not only evaluates weather reroute plan, but also provides both visual and quantitative assessment capabilities. An evaluation is essential to reassure NAS (National Airspace System) users that the plan will maximize aircraft throughput around severe weather, reduce aircraft delays, reduce cancellations, and maintain safe levels of controller workload.

The traffic display 26 provides a visual representation of traffic predictions resulting from the plan. It is also contemplated that graphical analysis displays provide a quantitative assessment of predicted plan performance and include metrics such as aircraft delays, extra miles flown, ground delays, and percent of weather impacted aircraft covered by the plan.

The plan shown in FIG. 2 requires less than ten seconds for ACCM 24 to evaluate. However, execution time increases as the number of conflict aircrafts or corridors increases. Since ACCM 24 is designed for rapid processing plans may be created, evaluated, modified, and re-evaluated quickly in time-satisfactory manner.

When the plan evaluation is complete, ACCM 24 displays the plan result including statistics on flight delays and the number of aircraft rerouted. Information is also displayed that was not able to be incorporated into the plan, including the number of flights that could not be rerouted onto any corridor, and the number of flights that would have turned too sharply to reach the designated corridor.

ACCM 24 also generates predicted sector loading based on the plan reroutes, in order that the traffic flow manager may determine whether the reroutes might cause unacceptable work loads for sector controllers.

If the traffic flow manager is unsatisfied with the results of the planned reroutes the plan can be modified. New corridors can be added to avoid congested areas or to increase the number of flights using the plan and other parameters of the plan can be modified. The new plan is then evaluated, a new set of reroutes is produced, and the results of the new plan are assessed. The cycle is repeated until the traffic flow manager is satisfied that the plan moves flights past the weather as efficiently and safely as possible.

Referring to FIG. 3, showing the major data processing in ACCM algorithm 24, the data processing is initiated at "Flight Rerouting" 40. To start the flight rerouting, the traffic flow management specialist provides information that is a plan for routing flights around a problem area. This plan information includes:

Reroute corridors information, including
the fixes the flights will transition on the corridor;
range of times when the corridor is open,
range of altitudes flights are allowed to use on the corridor,
turn angle limits for turning onto and off of the corridor.
Candidate flight list.

Flight rerouting will examine each flight and each candidate corridor to determine if a flight can use a corridor. In order to determine whether a flight can use a corridor the trajectory of the flight is modeled and the trajectory is used to calculate sector workloads.

A reroute flight plan is produced for each flight that can be successfully rerouted onto the corridor. The reroutes provide a way whereby flights avoid the problem area (such as weather) without creating new sector congestion. These reroutes are presented to the operators who examine the results and decide whether to modify the plan or accept the reroutes. From the flight rerouting step 40, the ACCM algorithm 24 supplies the reroute candidate flight plans to the "Trajectory Modeler" 42 which calculates a four-dimensional trajectory containing predicted locations and altitude at future times for the flight. The 4-D trajectory is based on a flight plan for the flight. Several types of information are used for trajectory calculations, including:

filed flight plan,
flight positions,
upper air winds,
air traffic control restrictions,
NAVAID and airport locations,
preferred routes,
aircraft performance data,
airport delay performance.

The 4-D trajectories are supplied to "Sector Workload Calculations" step 44 which uses the four-dimensional trajectory to predict workload in each sector where a flight is predicted to pass through. These calculations require information about the three-dimensional geometry of each sector and information about what workloads are permitted in each sector.

Turning now to FIG. 4, showing in detail a process flow for the ACCM algorithm 24, the weather problem resolution process flow is initiated with the block 50 "Candidate Flight List" where the ACCM 24 generates a candidate flight list which is the list of conflict flights that can potentially be rerouted to avoid weather or other problems. The list may be generated in a variety of schemes. For example, in one approach, ACCM 24 selects the flights predicted to enter flow constraint area (FCA) polygons 28, as shown in FIG. 2. These FCA polygons could be automatically generated from weather forecasts, or could be manually drawn.

After the candidate flight list is generated the logic flows to the block 52 "Sort Flights" where the candidate flight list is sorted into a processing order. This sorting may be accomplished in any number of ways. The main goal of the sorting is to provide a priority order for processing the flights into a candidate flight list. Flights sorted near the top of the candidate flight list will have a higher chance of successful rerouting with optimized routing. The prototype system currently uses the following sorting criteria:

active flights (flights in the air) before inactive flights, and then
first come-first served (processed by predicted time of arrival to the problem area).

This approach gives priority to active flights since they have the least flexibility, i.e., they cannot be ground delayed.

The order of sort is easily changed in case certain flights need to be given higher priority in order to achieve higher accuracy or higher efficiency or rerouting.

Upon completing the sorting in block 52, the information flow passes to the block 54 "For Each Flight in Sorted List" in order that the flights in the sorted list are processed one at a time in the sorted order. This is a form of optimization, which may, for example, be referred to as a "greedy approach" where, once a solution is found for one member, the solution is kept and processing goes to the next member. Other optimization techniques may be applied at this point for more highly optimized solutions.

From the block 54, the logic flows to block 56 "Select Best Available Corridor". Corridors are reroute segments that flights may use to avoid a problem area. There may be several corridors available for each flight. Corridors can be manually generated and tailored for the particular problem (usually weather) being handled, or they can be loaded from data base of previously generated corridors. Each corridor can have associated restrictions and parameters, including:

the list of fixes flights will fly through in the corridor,
the range of altitudes flights are allowed to use on the corridor,
the range of times when the corridor is open,
the maximum turn angle flights can use to turn to or from the corridor.

Due to restrictions as above discussed, not every corridor is available to every flight. Each flight has a set of candidate corridors and a cost associated with each corridor. The cost of using a corridor includes criteria such as additional miles flown, ground delay, and air delay. It is possible to calculate the cost as the total arrival delay, however, other cost calculations are contemplated in the scope of the present invention. Selecting the best available corridor involves determining the corridor with the lowest cost that has not been rejected.

From the block 56, the logic flows to the block 58 "Found One". If the best available corridor with the lowest cost is not found, the flow chart passes to the block 60 "Reject Flight" and the logic returns to the block 54 "For Each Flight in Sorted List" to loop through the blocks 56, 58, and 60 again, repeating the process conducted therein.

If however in block 58, the best available corridor is found, the flow chart passes to the block 62 "Calculate Reroute Trajectory Using Corridor", in which for a candidate corridor which has been selected for consideration, a four-dimensional trajectory is calculated for reroute of the flight onto the corridor. This 4-D trajectory contains predicted locations and altitudes at future times for the flight using the reroute onto the corridor. Several types of information are used for 4-D trajectory calculations, including:

filed flight plan, flight position, upper air winds, air traffic control restrictions, NAVAID and airport locations, preferred routes, aircraft performance data, airport delay performance.

Upon the four-dimensional trajectory being calculated in block 62, the logic flows to the block 64 "Calculate Sector Workload for Sectors Crossed", wherein the effect on sector workloads of the flight reroute is predicted. Sectors are the geographic regions where a single controller team controls traffic. If the workload of the controller team is predicted to be excessively high this results in a potentially unsafe situation which should be avoided (if possible).

Currently, sector workload is measured by predicting the maximum number of flights in a sector each minute. This maximum is compared to a threshold called the Monitor Alert Parameter (MAP) and, if the number of flights exceeds the MAP, an alert is displayed to indicate that the situation is potentially unsafe. The MAP is tailored for each sector and can be a different value for each sector.

Users may specify parameters that allow higher workload limits, or restrict to even lower limits than the MAP values. This gives additional flexibility to the users to handle difficult problems, or to reserve capacity for flights that may come into the system at a later time.

Other methods for predicting sector workload using more sophisticated techniques may be incorporated into the weather problem resolution algorithm and are contemplated within the scope of the subject invention concept.

Upon calculating the sector workloads in block 64, the flow chart passes to the block 66 "Sector Workloads Within Limits", where once the effect of the corridor reroute of the flight on sector workloads is determined, the resulting sector workloads are checked to determine if the addition of this reroute causes new alerts for potentially unsafe situations. If no new alerts are caused, i.e., if the sector workload is within predetermined limitations, the logic flows to the block 68 "Accept Reroute" where the reroute is accepted and returns back to the block 54 "For Each Flight in Sort List" for further processing.

If however the sector workload exceeds predetermined limitations, and the addition of the reroute causes sector workload alerts, the logic flows to the block 70 "Can Be Ground Delayed", where the flight is checked to determine if ground delay is possible. If ground delay is not possible, the flow chart passes to the block 74 "Reject Corridor", where the corridor is rejected for this flight, and the logic passes further to the block 56 "Select Best Available Corridor" in order that the next best corridor for the flight is examined.

If, however, in block 70 "Can Be Ground Delayed", it is determined that the flight can be ground delayed, the flow chart passes to the block 72 "Add Ground Delay" where the flights that can be ground delayed, are assigned ground delay in order to avoid predicted sector workload problems. By delaying on the ground, the flight can arrive in congested sectors after the congestion is terminated. The ACCM algorithm 24 searches for a ground delay period that will allow the flight to reroute onto the corridor and fly to the destination while avoiding predicted sector workload alerts.

Once a ground delay value is determined, the corridor being examined may no longer be the best available due to the additional ground delay. If another corridor has the potential for lower cost, that corridor must then be examined. Thus, from the block 72, the logic passes to the block 56 "Select Best Available Corridor". If however no other corridor can potentially have lower cost, then the previously selected corridor can be accepted.

While ACCM 24 of the present invention is described supra as directed specifically to weather problems, it is also operable for other flow restriction problems. For example, an equipment failure disrupting ATC (Air Traffic Control) in a particular region may be handled using ACCM 24 by manually generating an FCA around the region and building corridors to re-route flights around the FCA.

Laboratory assessment of ACCM 24 of the present invention has been conducted. First, an assessment of the accuracy of the weather forecast product was made. This assessment resulted in a recognition that convective weather forecasts need to develop algorithms to account for storm initiation, growth, and decay. Also, convective weather forecasts need to become more accurate, extend out at least 2–3 hours, and improve vertical resolution of storm tops in order to be useful for weather reroute planning.

The ACCM is an effective tool for dealing with large convective weather systems and other traffic flow problems. The ability of the ACCM 24 to safely reduce flight delays caused by convective weather can be even further improved by improved weather forecasts and understanding the forecast accuracy, extended collaboration, including ATCSCC (Air Traffic Control System Command Center), ARTCC (Air Route Traffic Control Center), airlines, and pilots, improved load balancing and resource rationing, improved controller workload predictions, improved management of forecasting in accuracy.

Although this invention has been described in connection with specific forms and embodiments thereof, it will be appreciated that various modifications other than those discussed above may be resorted to without departing from the spirit or scope of the invention. For example, equivalent elements may be substituted for those specifically shown and described, certain features may be used independently of other features, and in certain cases, particular locations of elements may be reversed or interposed, all without departing from the spirit or scope of the invention as defined in the appended claims.

What is claimed is:

1. A method for weather problem resolution in air traffic flow management, comprising the steps of:

a. automatically deriving a flow constrained area (FCA) from a weather forecast product;

b. generating a Candidate Flight List including conflict flights predicted to be affected by said FCA;

c. for each conflict flight from said Candidate Flight List, generating reroute corridors available for said each conflict flight, each reroute corridor having restriction parameters associated therewith;

d. selecting the best available reroute corridor from said generated available corridors;

e. calculating a four-dimensional trajectory for reroute of said each conflict flight onto said best available reroute corridor;

f. based on the four-dimensional trajectory, estimating workload in geographic sectors affected by rerouting said each conflict flight onto said best available reroute corridor, and g. accepting said best available corridor for said each conflict flight responsive to said workload in said geographic sectors being below pre-set levels.

2. The method of claim 1, further comprising the steps of:

displaying said FCA as a polygon, and displaying said available reroute corridors.

3. The method of claim 1, further comprising the steps of:

sorting said Candidate Flight List in accordance with predetermined sorting criteria prior to said step (c) for establishing a priority order of said conflict flights for being prescribed with available reroute corridors.

4. The method of claim 3, wherein said Candidate Flight List is sorted based on flight status.

5. The method of claim 3, wherein said Candidate Flight List is sorted based on a predicted time of arrival to said FCA.

6. The method of claim 3, further comprising the step of:

changing said sorting criteria to change a priority order.

7. The method of claim 1, wherein said available reroute corridors are generated by a Traffic Flow Manager.

8. The method of claim 1, wherein said available reroute corridors are unloaded for further processing from a database of previously generated reroute corridors.

9. The method of claim 1, wherein said restriction parameters, associated with each said reroute corridor, include:

a list of fixes which said each conflict flight flies through on said reroute corridor.

10. The method of claim 1, wherein said restriction parameters associated with each said reroute corridor, include:

a range of altitudes which said each conflict flight is allowed to use on said reroute corridor.

11. The method of claim 1, wherein said restriction parameters, associated with each said reroute corridor, include:

a range of times when said reroute corridor is open.

12. The method of claim 1, wherein said restriction parameters, associated with each said reroute corridor, include:

the maximum turn angle which said each conflict flight can use to turn onto or from said reroute corridor.

13. The method of claim 1, wherein said each conflict flight has a cost associated with use of each said generated reroute corridor, further comprising selection of said best available reroute corridor as the reroute corridor with the lowest cost.

14. The method of claim 13, wherein said cost of using said each reroute corridor includes additional miles flown, ground delay, air delay, or total arrival delay.

15. The method of claim 1, wherein said four-dimensional trajectory includes predicted locations and altitude of said each conflict flight at future times, the method further comprising the steps of:

calculating said four-dimensional trajectory based on conflict flight positions, upper air winds, Air Traffic Control restrictions, NAVAID and airport locations, preferred routes, aircraft performance data, and airport delay performance.

16. The method of claim 1, further comprising the steps of:

checking whether said each conflict flight can be ground delayed, if said workload of said at least one predetermined geographic sector is above said pre-set level; and searching for ground delay period for said each conflict flight to avoid exceeding of said pre-set level of said workload in said at least one geographic sector.

17. The method of claim 16, further comprising the step of:

rejecting said best available reroute corridor if said ground delay is impossible, and selecting another best available reroute corridor from said generated reroute corridors.

18. The method of claim 16, further comprising the steps of:

searching for another best available reroute corridor from said generated reroute corridors having potentially lower cost.

19. The method of claim 1, wherein said weather forecast product includes National Convective Weather Forecast updated with predetermined time intervals.

20. The method of claim 1, wherein said weather forecast product includes Collaborative Convective Forecast product.

21. The method of claim 2, wherein said FCA polygons represents detections and predictions of severe weather extending out in predetermined intervals.

22. A traffic flow management system for weather problem resolution, comprising:

a weather forecast product, processing means operatively coupled to said weather forecast product for deriving a Flow Constrained Area (FCA) therefrom, a traffic display coupled to said processing means for displaying said FCA thereon, means for predicting conflict flights affected by said FCA and for generating a Candidate Flight List of said conflict flights, means for sorting said Candidate Flight List to establish a priority order of said conflict flights in accordance with a predetermined priority criteria, means for generating a plurality of available reroute corridors for each of said conflict flights in the order of the established priority, means for selecting the best available reroute corridor from said plurality of the generated available reroute corridors, means for calculating a four-dimensional trajectory for reroute of said each conflict flight onto said best available reroute corridor, and means for estimating workload in geographic sectors affected by rerouting of said each conflict flight onto said best available reroute corridor.

23. The traffic flow management system for weather problem resolution of claim 22, further comprising:

means for comparing said estimated workload in said geographic sectors with pre-set workload levels, means for searching for ground delay of said each conflict flight if any said estimated workload exceeds said pre-set workload level, and means for searching for another best available reroute corridor if said ground delay of said each conflict flight is unavailable.

24. The traffic flow management system for weather problem resolution of claim 22, further comprising:

means for assigning restriction parameters to each of said plurality of the generated available reroute corridors, said restriction parameters including:

a list of fixes which said each conflict flight flies through on said each reroute corridor, a range of times when said each reroute corridor is open, and the maximum turn angle which said each conflict flight can use to turn onto or from said each reroute corridor.

25. The traffic flow management system for weather problem resolution of claim 22, further comprising:

means for estimating a cost of said each conflict flight associated with each of said plurality of the generated available reroute corridors, and means for selecting said best available reroute corridor for said each conflict flight as the least costly reroute corridor.

* * * * *